United States Patent [19]

Salice

[11] Patent Number: 4,982,476
[45] Date of Patent: Jan. 8, 1991

[54] MOUNTING PLATE FOR A FURNITURE HINGE OR THE LIKE

[75] Inventor: Luciano Salice, Carimate, Italy

[73] Assignee: Arturo Salice S.p.A., Novedrate, Italy

[21] Appl. No.: 448,126

[22] Filed: Dec. 13, 1989

[30] Foreign Application Priority Data

Dec. 13, 1988 [DE] Fed. Rep. of Germany ....... 3841933

[51] Int. Cl.$^5$ .............................................. E05D 5/00
[52] U.S. Cl. ......................................... 16/382; 16/237
[58] Field of Search ................. 16/382, 237, DIG. 43, 16/235, 251, 383, 328, DIG. 39, DIG. 40

[56] References Cited

U.S. PATENT DOCUMENTS

| | | | |
|---|---|---|---|
| 3,255,658 | 6/1966 | Gargrave | 411/332 |
| 4,091,499 | 5/1978 | Lautenschlager | 16/242 |
| 4,642,846 | 2/1987 | Lautenschlager | 16/DIG. 39 |
| 4,785,497 | 11/1988 | Salice | 16/237 |
| 4,800,625 | 1/1989 | Salice | 16/382 |
| 4,862,556 | 9/1989 | Grass | 16/382 |

FOREIGN PATENT DOCUMENTS

| | | |
|---|---|---|
| 2751459 | 1/1978 | Fed. Rep. of Germany . |
| 8631650 | 4/1985 | Fed. Rep. of Germany . |
| 8620441 | 11/1986 | Fed. Rep. of Germany . |
| 3717376 | 5/1987 | Fed. Rep. of Germany . |

Primary Examiner—Richard K. Seidel
Assistant Examiner—Chuck Y. Mah
Attorney, Agent, or Firm—Fleit, Jacobson, Cohn, Price, Holman & Stern

[57] ABSTRACT

In a mounting plate, a baseplate is reliably held in engagement with a cover plate and in a centered position relative thereto by fixing screws which are only partly screwed into the baseplate because a side face portion of each screw thread bears on the top edge of the associated slot and the diametrically opposite portion of the same convolution of the screw thread is disposed in the baseplate below the cover plate and the baseplate is thus held by the premounted fixing screws against the cover plate in a centered position relative to the latter. The screwed-in fixing screws are reliably held in the baseplate to extend at right angles thereto so that the retaining side face portion of the screw cannot slip from the edge of the slot owing to a possible inclination of the fixing screw. The fixing screws are suitably screwed through the baseplate to such an extent that the forward ends of the screws protrude from the baseplate and during the mounting operation can be inserted into the holes which have been drilled into the carrying wall.

8 Claims, 2 Drawing Sheets

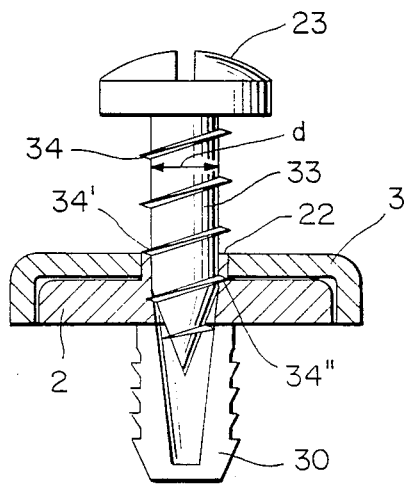
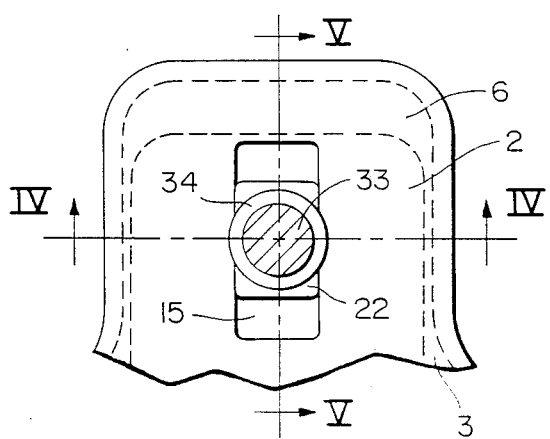
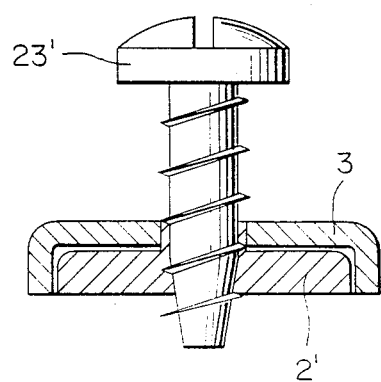
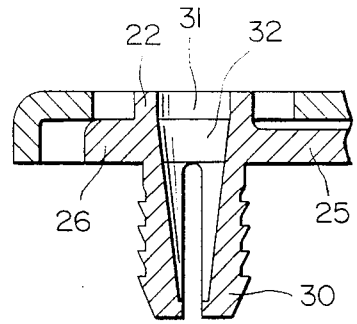
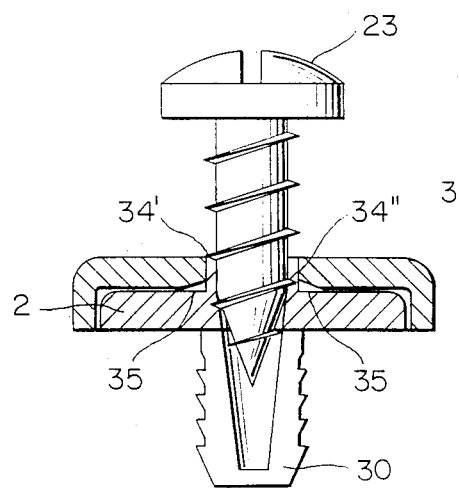

MOUNTING PLATE FOR A FURNITURE HINGE OR THE LIKE

FIELD OF THE INVENTION

This invention relates to a mounting plate for a furniture hinge or the like, consisting of a baseplate, which is provided with bores for fixing screws and adapted to be secured to a carrying wall or the like, and a cover plate, which at least partly overlies or covers the baseplate and is slidably guided on the baseplate transversely to a hinge bracket or the like and provided with means for mounting the hinge bracket, wherein premounted fixing screws extend through slots in the cover plate and are partly screwed in bores of the baseplate.

BACKGROUND OF THE INVENTION

In a vertically adjustable mounting plate of the kind which is known from German Utility Model Specification 86 20 441 the baseplate consists of plastic and the bores in the baseplate are surrounded at least in part by pedestals, which partly extend through the slots and constitute guides for the side faces of the slots so that the pedestals of the baseplate can be held as an interference fit in an intermediate portion of the slots in the cover plate. A mounting of the baseplate in such a manner that the pedestals and also the bores in the baseplate are disposed in an intermediate portion of the slots in the cover plate is desirable because the bores in the carrying wall or the like will usually be disposed at the proper locations so that a subsequent adjustment in height will not be required But when that known mounting plate is supplied without premounted fixing screws there will be a risk that the baseplate may separate from the cover plate when pressure is inadvertently applied to the baseplate during the transportation of the baseplate or before the mounting operation and the baseplate will then no longer be arranged relative to the cover plate in a centered position by which the mounting of the mounting plate is facilitated.

SUMMARY OF THE INVENTION

For this reason it is an object of the invention to provide a mounting plate which is of the kind described first hereinbefore and in which an inadvertent separation of the baseplate and cover plate will be prevented before the mounting operation.

In the mounting plate in accordance with the invention the baseplate is reliably held in engagement with the cover plate and in a centered position relative thereto by the fixing screws which are only partly screwed into the baseplate because a side face portion of each screw thread bears on the top edge of the associated slot and the diametrically opposite portion of the same convolution of the screw thread is disposed in the baseplate below the cover plate and the baseplate is thus held by the premounted fixing screws against the cover plate in a centered position relative to the latter. The screwed-in fixing screws are reliably held in the baseplate to extend at right angles thereto so that the retaining side face portion of the screw cannot slip from the edge of the slot owing to a possible inclination of the fixing screw. The fixing screws are suitably screwed through the baseplate to such an extent that the forward ends of the screws protrude from the baseplate and during the mounting operation can be inserted into the holes which have been drilled into the carrying wall.

In the mounting plate in accordance with the invention the baseplate in its centered position is non-positively forced as a press fit against the cover plate. That centered position can be determined by the premounted fixing screws or by the pedestals, which surround the bores in the baseplate and extend through the slots in the cover plate, or in that the edges of the cover plate overlie the sides of the baseplate adjacent to the flange-like lateral lugs. A centered position which is ensured by the fixing screws will facilitate the mounting operation if the bores provided in the furniture part, and serving to receive the fixing screws, are at the proper locations, as will usually be the case. On the other hand, the cover plate can be displaced relative to the baseplate if the engaging force is overcome when an adaption is required.

The cover plate of the mounting plate in accordance with the invention nab be made of sheet steel or as a diecasting (Zamak) and the baseplate is preferably made of plastic.

Adjacent to the pedestals of the mounting plate, the bores for the fixing screws have a bore portion which has a diameter which is equal to the root diameter of the fixing screws. In that case the screwing of the fixing screws into the baseplate will not result in a displacement of material of the pedestal and a friction-increasing clamping action between the guiding pedestals and the side faces of the slots will thus be avoided.

Adjacent to the pedestals of the baseplate, the bores for the fixing screws desirably comprise another, lower bore portion, which has a diameter that is smaller than the root diameter of the fixing screws.

This design ensures that the premounted fixing screws will be held to extend at right angles to the baseplate and cannot assume an inclined position, which might cause the retaining side face of the screw thread to slip from the edge of the slot. As a result, the fixing screws can be premounted in that they are partly screwed into the bores in the baseplate to such an extent that a portion of the side face of a convolution of the screw thread engages the edge of the slot whereas the diametrically opposite portion of the same convolution of the screw thread has already cut into the baseplate below the cover plate. In the mounting plate in accordance with the invention, the cover plate can slidably be adjusted in height relative to the baseplate because the screw threads will not cut into the side faces of the slots so that the desired displacement would be prevented. As the diameter of the screw threads of the fixing screws exceeds the width of the slots, the retaining side faces of the screw threads cannot slip from the edges of the slots because the premounted fixing screws are held in the baseplate to extend at right angles to the baseplate and cannot be inclined. As a result, the thread portion which engages an edge of the slot will reliably retain the baseplate in its centered position against the cover plate even when pressure is inadvertently applied to the fixing screws during transportation or before the mounting operation.

That portion of the convolution of the screw thread which is diametrically opposite to that portion of the convolution of the screw thread which is supported by the top edge of the slot will reliably cut into the wall of the bore of the baseplate below the cover plate if the lead of the screw threads of the fixing screws exceeds twice the thickness of the cover plate.

The lead of the screw threads of the fixing screws is desirably twice the thickness of the cover plate at the edges of the slot. That design ensures that side faces of a convolution of a screw thread will bear on the top edge of the slot and on the opposite bottom edge of the slot in the cover plate so that diametrically opposite portions of the edges of the slot are retained in one convolution of the screw threads of the fixing screw.

A desirable feature of the invention resides in that the fixing screws are provided with double threads. That design ensures that side faces of both screw threads bear on mutually opposite top edges of the slot. That symmetrical support will ensure an improved retention.

The baseplate is desirably provided on the underside with plugs, which have bores that are aligned with the bores in the baseplate. That design will be particularly desirable when the mounting plate has been premounted on the hinge bracket before it is delivered. In that case the plugs can be inserted into the predrilled fixing holes so that the door can be supported by the carrying wall before the fixing screws are entirely screwed in to expand the plugs.

The edge portions of the slots are suitably provided on their top and bottom sides with beveled surfaces, rounded portions or thickness-reducing steeps. With that design the mounting plates can be adapted to conventional fixing screws having conventional leads.

A further feature resides in that the width of the slots in the cover plate equals the root diameter of the fixing screws. In that case the guiding pedestals of the baseplate may be omitted because the side faces of the slots will be guided on the cylindrical shanks of the fixing screws between adjacent screws in an intermediate portion of the slots which will be ensured because the baseplate is held in frictional contact with the cover plate by the premounted fixing screws.

BRIEF DESCRIPTION OF THE DRAWINGS

Illustrative embodiments of the invention will now be explained in more detail with reference to the drawing, in which

FIG. 3 is a top plan view showing on a larger scale that portion of the mounting plate which is provided with the slot and with the fixing screw shown in section.

FIG. 4 is a sectional view taken on line IV—IV in FIG. 3 and showing the mounting plate.

FIG. 5 is a sectional view taken on line V—V in FIG. 3 and showing the mounting plate without fixing screws.

FIG. 6 is a sectional view that is similar to FIG. 4 and illustrates a different embodiment of the mounting plate.

FIG. 7 is a sectional view which is similar to FIG. 4 and illustrates a mounting plate having a baseplate without plugs.

DETAILED DESCRIPTION OF THE PREFERRED EMBODIMENT

Figure 2:
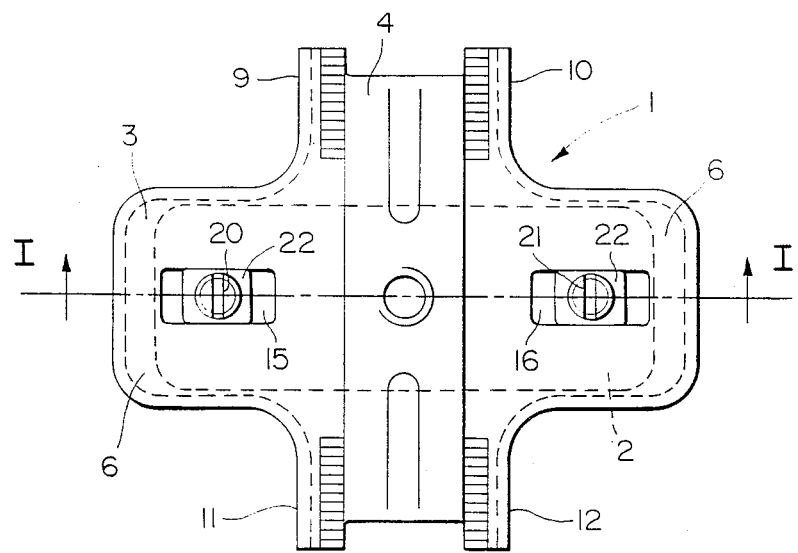
FIG. 2 is a top plan view showing the mounting plate of FIG. 1 without premounted fixing screws.

The mounting plate 1 consists of a baseplate 2 which in a top plan view is rectangular and has rounded corners as shown in phantom lines in FIG. 2, and a cover plate 3, which entirely overlies the baseplate.

The cover plate 3 is a sheet steel stamping and comprises a channel-shaped, outwardly protruding central portion forming a mounting pedestal 4, which serves to mount a hinge bracket, which is usually channel-shaped. The cover plate 3 may alternatively consist of a diecasting e.g., of Zamak. The hinge bracket, not shown, has side flanges which embrace the mounting pedestal 4 which is constituted by the channel portion and which is formed in an intermediate portion thereof with a tapped bore 5, into which the fixing screw for the hinge bracket can be screwed.

The mounting pedestal 4 which is constituted by the central portion of the coverplate 3 is provided with flange-like lugs 6, 6 which serve to secure the mounting plate or the cover plate 3 to a carrying wall or the like. Said luglike lateral extensions are provided at their periphery with a depending flange portion 7, 8, which covers the adjacent side portions 9, 10, 11, 12 of the central portion.

The cover plate 3 is symmetrical with respect to its longitudinal center line and its transverse center line I—I so that the mounting plate may be used to mount a hinge which is fixed on the right or on the left.

The luglike lateral extensions 6, 6 of the cover plate 3 are formed with slots 15, 16, which have center lines which are aligned with the transverse center line I—I.

Figure 1:
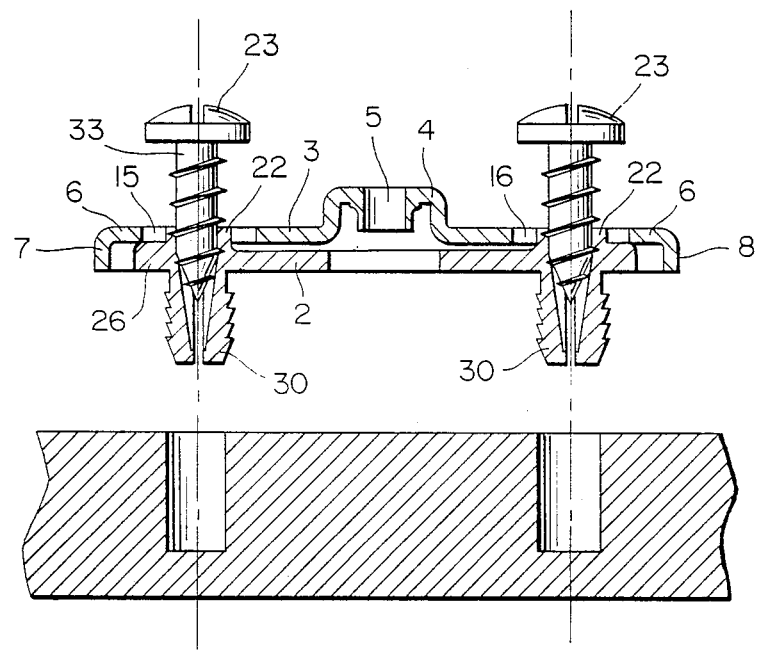
FIG. 1 is a sectional view that is taken on line I—I in FIG. 2 and shows the mounting plate which consists of a baseplate and a cover plate and is provided with premounted fixing screws and shows also the carrying wall provided with fixing bores.

The baseplate 2 is substantially rectangular and as shown in FIGS. 1 and 2 is laterally covered by the edge flanges 7, 8 of the luglike extensions 6, 6 of the cover plate 3. The end portions of the baseplate are formed on a center line of the baseplate, which coincides with the transverse center line I—I of the cover plate, with bores 20, 21, which serve to receive fixing screws 23. The bores 20, 21 are surrounded by pedestallike elevations 22, 22, which are rectangular in a top plan view and in the assembled mounting plate contact the side faces of the slots 15, 16 in the cover plate 3. The height of the pedestals 22, 22 is smaller than the thickness of the sheet metal of the cover plate 3 and for this reason the pedestals 22, 22 do not extend through the slots 15, 16. As is apparent from FIGS. 1 and 2 the pedestals 22, 22 are shorter than the slots 15, 16. As a result, the cover plate 3 can be displaced on the baseplate 2 along the transverse center line I—I and will exactly be guided by the side faces of the pedestals 22 22 in contact with the side faces of the slots 15, 16.

To permit a transverse displacement of the cover plate 3 the baseplate 2 when it is in its central position terminates at a distance from the edge flanges 7, 8 of the cover plate 3, as is apparent from the dotted contour lines in FIG. 2. Because the cover plate 3 is guided by the pedestallike projections 22, 22 of the baseplate 2, there is a clearance between the sides of the baseplate 2 and the lateral edge flanges of the luglike extensions 6, 6 of the cover plate 3.

The baseplate 2 is made of a suitable plastic. In the embodiment shown in FIGS. 1 to 6 the baseplate 2 consists of an integral injection molding of plastic which is provided on its underside adjacent to the bores 20, 21 with plugs 30, which have center lines that are aligned with the center lines of the bores 20, 21. In known manner the plugs are formed with mutually opposite longitudinal slots and their outside peripheral surface is sawtooth-shaped in cross-section.

Adjacent to the pedestals 22, 22, the bores 20, 21 have portions 31 (see FIG. 5) which have a diameter that is approximately as large as the root or core 33 having diameter d of the fixing screws 23. That bore portion 31 is succeeded by a downwardly tapering conical bore portion 32, into which the screw threads 34 of the fixing screws 23, 23 are adapted to cut during the preliminary mounting operation.

During the preliminary mounting operation, the core 33 of the fixing screws 23, 23 is guided in the first bore portion 31 exactly at right angles to the cover plate 3 and the fixing screws 23, 23 are screwed only in part into the second portion 32 so that they will reliably be held in their position at right angles and will not expand the plugs 30.

The screw threads 34 of the fixing screws 23, 23 have a lead or pitch which exceeds the thickness of the cover plate 3. This means that the lead of the screw threads 34 of the fixing screws is so large that the spacing of adjacent convolutions of the screw threads is at least twice the thickness of the cover plate 3 at the edges of the slots 15, 16.

As a result of the preliminary mounting operation a side face portion 34' of the screw threads 34 bears on a top edge of the slots 15, 16 and the side face portion 34' of the screw threads which is diametrically opposite to the first-mentioned side face portion has cut into the baseplate 2 below the cover plate 3. The diameter of the screw threads 34 exceeds the width of the slots 15, 16. The root diameter d of the core 33 of the screw is preferably smaller than the width of the slots 15, 16 so that the support of a side face of the screw threads at an edge of the slots will be ensured when the fixing screws are held in the bores of the baseplate and extend at right angles thereto.

Because the lead of the screw threads 34 of the fixing screws 23, 23 is so large that said screws cannot cut into the side faces of the slots 15, 16, the cover plate 3 can be displaced on the baseplate along the slots for an adjustment unless the fixing screws have entirely been screwed in and tightened.

In the embodiment shown in FIG. 6 the edges of the slots 15, 16 are formed on their underside with beveled surfaces 35 so that the edges of the slots in the cover plate have a thickness which is adapted to the lead of the screw threads of conventional screws.

Because the diameter of the screw threads of the fixing screws 23, 23 exceeds the width of the slots 15, 16, the baseplate 2 is held in engagement with the cover plate 3 because the fixing screws are retained in the fixing bores in the baseplate to extend at right angles thereto so that the screw threads cannot pass through the slots. The baseplates will not be separated from the cover plate and the preadjusted centered position will be maintained even when pressure is inadvertently applied to the fixing screws.

In the embodiment shown in FIG. 7 a substantially flat baseplate 2' is provided, which has no integrally molded plugs. In that case the baseplate 2' serves only for a preliminary mounting of the fixing screws 23, 23' in a centered position and as is shown.

I claim:

1. A mounting for a furniture hinge including a hinge bracket, said mounting plate comprising:
    a baseplate provided with bores for receipt of fixing screws and adapted to be secured to a carrying wall,
    a cover plate at least partly covering the baseplate and said cover plate being slidably guided on the baseplate transversely to the hinge bracket and including means for mounting the hinge bracket so that premounted fixing screws extend through slots in the cover plate and are partly screwed in said bores of the baseplate, and
    fixing screws having a thread diameter greater than a width of the slots and the pitch of the screw threads of the fixing screws is at least twice the thickness of the cover plate at edges of the slots so that a side face of each screw thread bears on top of an edge of the slots to hold the baseplate in engagement with the cover plate.

2. A mounting plate according to claim 1, wherein the bores for the fixing screws comprise, adjacent to pedestals of the baseplate, a bore portion having a diameter that is equal to a core diameter of the fixing screws.

3. A mounting plate according to claim 2, wherein the bores are provided with another, lower bore portion, having a diameter smaller than the core diameter of the fixing screws.

4. A mounting plate according to claim 1, wherein the pitch of the screw threads of the fixingscrews equals twice the thickness of the cover plate at the edges of the slots.

5. A mounting plate according to claim 1, wherein the fixing screws are provided with double screw threads.

6. A mounting plate according to claim 1, wherein the baseplate is integrally formed on its underside with plugs having bores aligned with the bores in the baseplate.

7. A mounting plate according to claim 1, wherein the edge portions of the slots are provided on one of their sides with beveled surfaces.

8. A mounting plate according to claim 1, wherein the width of the slots in the cover plate corresponds to the core diameter of the fixing screws.

* * * * *